US008000754B2

(12) United States Patent
Nakayama et al.

(10) Patent No.: US 8,000,754 B2
(45) Date of Patent: Aug. 16, 2011

(54) VEHICULAR HANDSFREE APPARATUS

(75) Inventors: Yuji Nakayama, Kariya (JP); Kenji Miyake, Anjo (JP); Yuji Shinkai, Novi, MI (US)

(73) Assignee: Denso Corporation, Kariya (JP)

( * ) Notice: Subject to any disclaimer, the term of this patent is extended or adjusted under 35 U.S.C. 154(b) by 415 days.

(21) Appl. No.: 12/290,056

(22) Filed: Oct. 27, 2008

(65) Prior Publication Data

US 2009/0111530 A1    Apr. 30, 2009

(30) Foreign Application Priority Data

Oct. 29, 2007    (JP) ................................. 2007-280291

(51) Int. Cl.
*H04M 1/00*    (2006.01)
(52) U.S. Cl. .................. 455/569.2; 455/569.1; 455/41.2
(58) Field of Classification Search ............... 455/569.2, 455/41.2, 569.1, 575.9
See application file for complete search history.

(56) References Cited

U.S. PATENT DOCUMENTS

| | | | |
|---|---|---|---|
| 7,251,507 B2 | 7/2007 | Kitao et al. | |
| 2002/0064263 A1* | 5/2002 | McBrearty et al. | 379/142.01 |
| 2006/0025112 A1* | 2/2006 | Hamanaga et al. | 455/412.1 |
| 2006/0262103 A1* | 11/2006 | Hu et al. | 345/173 |
| 2007/0178944 A1 | 8/2007 | Mitsuru et al. | |
| 2008/0085745 A1 | 4/2008 | Ozaki | |

FOREIGN PATENT DOCUMENTS

| | | |
|---|---|---|
| DE | 10 2006 011 121 | 9/2007 |
| JP | 11-331418 | 11/1999 |
| JP | 2001-16300 | 1/2001 |
| JP | 2002-193046 | 7/2002 |
| JP | 2002-291044 | 10/2002 |
| JP | 2003-264625 | 9/2003 |
| JP | 2006-217081 | 8/2006 |
| JP | 2008-98767 | 4/2008 |
| WO | WO 2006/074345 | 7/2006 |
| WO | WO 2007/108825 | 9/2007 |

OTHER PUBLICATIONS

Bluetooth SIG, Inc.: "Bluetooth Specification—Phone Book Access Profile (PBAP) VI0R00" Specification, Jul. 24, 2006, XP002511032.*
Phone Book Access Profile, Bluetooth Specifications, pp. 1-41.
Search Report dated Feb. 9, 2009 in EPC Application No. 08018758.6.
Office action dated Aug. 4, 2009 in corresponding Japanese Application No. 2007-280291.

* cited by examiner

*Primary Examiner* — Edward Urban
*Assistant Examiner* — Golam Sorowar
(74) *Attorney, Agent, or Firm* — Harness, Dickey & Pierce, PLC

(57) ABSTRACT

When telephone directory data is transmitted from a cellular phone to a vehicular handsfree apparatus, only a portion of the telephone directory data that reflects call history data of outbound calls or inbound calls is selectively transmitted, for use as the telephone directory data in the apparatus, in a manner that associates registration names used in the cellular phone with telephone numbers in the call history data transmitted from the cellular phone, instead of transmitting all of registered telephone directory data.

4 Claims, 8 Drawing Sheets

FIG. 2A

| # | TIME | PHONE NO |
|---|---|---|
| 01 | 08.10 12:40 | 09011111111 |
| 02 | 08.10 11:22 | 09022222222 |
| 03 | 08.10 09:57 | 0566555555 |
| 04 | 08.10 09:35 | 0566223333 |
| 05 | 08.10 08:40 | 09011111111 |
| 06 | 08.10 07:28 | 0524444444 |
| 07 | 08.09 21:40 | 09066661111 |
| : | : | : |
| 20 | 08.08 11:50 | 09066661111 |

FIG. 2B

| # | TIME | PHONE NO |
|---|---|---|
| 01 | 08.10 11:20 | 09066661111 |
| 02 | 08.10 10:42 | 09066661111 |
| 03 | 08.10 09:33 | 0566223333 |
| 04 | 08.10 08:11 | 0566223333 |
| 05 | 08.10 07:40 | 0522223333 |
| 06 | 08.09 22:15 | 09011113333 |
| 07 | 08.09 12:40 | 09044443333 |
| : | : | : |
| 20 | 08.08 18:56 | 09044447777 |

FIG. 3

| #   | NAME     | PHONE NO    |
|-----|----------|-------------|
| 01  | YAMADA   | 09011111111 |
| 02  | OOKI     | 0522223333  |
| 03  | OKADA    | 09044447777 |
| 04  | OOTA     | 09011113333 |
| 05  | TANAKA   | 09066661111 |
| 06  | MATUMOTO | 0566223333  |
| 07  | OKAMURA  | 0566555555  |
| ⋮   | ⋮        | ⋮           |
| 101 | NISHIOKA | 0524444444  |
| 102 | AOKI     | 09022222222 |
| ⋮   | ⋮        | ⋮           |
| 201 | KITAMURA | 09044443333 |
| ⋮   | ⋮        | ⋮           |
| 500 |          |             |

FIG. 5

| # | TIME | PHONE NO |
|---|---|---|
| 01 | 08.10 12:40 | 09011111111 |
| 02 | 08.10 11:22 | 09022222222 |
| 03 | 08.10 11:20 | 09066661111 |
| 04 | 08.10 10:42 | 09066661111 |
| 05 | 08.10 09:57 | 0566555555 |
| 06 | 08.10 09:35 | 0566223333 |
| 07 | 08.10 09:33 | 0566223333 |
| 08 | 08.10 08:40 | 09011111111 |
| 09 | 08.10 08:11 | 0566223333 |
| 10 | 08.10 07:40 | 0522223333 |
| 11 | 08.10 07:28 | 0524444444 |
| 12 | 08.09 22:15 | 09011113333 |
| 13 | 08.09 21:40 | 09066661111 |
| 14 | 08.09 12:40 | 09044443333 |
| : | : | : |
|  | 08.08 18:56 | 09044447777 |
| : | : | : |
| 40 | 08.08 11:50 | 09066661111 |

FIG. 6

| # | TIME | PHONE NO |
|---|---|---|
| 01 | 08.10 12:40 | 09011111111 |
| 02 | 08.10 11:22 | 09022222222 |
| 03 | 08.10 11:20 | 09066661111 |
| 04 | 08.10 09:57 | 0566555555 |
| 05 | 08.10 09:35 | 0566223333 |
| 06 | 08.10 07:40 | 0522223333 |
| 07 | 08.10 07:28 | 0524444444 |
| 08 | 08.09 22:15 | 09011113333 |
| 09 | 08.09 12:40 | 09044443333 |
| : | : | : |
|  | 08.08 18:56 | 09044447777 |
| : | : | : |
| 40 |  |  |

FIG. 7

| # | PHONE NO | NAME |
|---|---|---|
| 01 | 09022222222 | AOKI |
| 02 | 09044443333 | KITAMURA |
| 03 | 0566223333 | MATUMOTO |
| 04 | 0524444444 | NISHIOKA |
| : | : | : |
|  | 0522223333 | OOKI |
|  | 09011113333 | OOTA |
|  | 09044447777 | OKADA |
|  | 0566555555 | OKAMURA |
| : | : | : |
|  | 09066661111 | TANAKA |
| : | : | : |
|  | 09011111111 | YAMADA |
| : | : | : |

FIG. 8

| # | PHONE NO | NAME |
|---|---|---|
| 01 | 09066661111 | TANAKA |
| 02 | 0566223333 | MATUMOTO |
| 03 | 09011111111 | YAMADA |
| 04 | 09022222222 | AOKI |
| 05 | 0566555555 | OKAMURA |
| 06 | 0522223333 | OOKI |
| 07 | 0524444444 | NISHIOKA |
| 08 | 09011113333 | OOTA |
| 09 | 09044443333 | KITAMURA |
| 10 | 09044447777 | OKADA |
| : | : | : |

FIG. 9A

```
DIRECTOR DATA SEARCH
   (SORTED BY NAME)
 AOKI        09022222222
 KITAMURA    09044443333
 OOKI        0522223333
 OOTA        09011113333
 OKADA       09044447777
 OKAMURA     0566555555
```
~5

FIG. 9B

```
DIRECTORY DATA
(SORTED BY # OF CALLS)
 TANAKA      09066661111
 MATUMOTO    0566223333
 YAMADA      09011111111
 AOKI        09022222222
 OKAMURA     0566555555
 OOKI        0522223333
```
~5

VEHICULAR HANDSFREE APPARATUS

CROSS REFERENCE TO RELATED APPLICATION

The present application is based on and claims the benefit of priority of Japanese Patent Application No. 2007-280291 filed on Oct. 29, 2007, the disclosure of which is incorporated herein by reference.

FIELD OF THE INVENTION

The present disclosure generally relates to a vehicular handsfree apparatus for use in a vehicle.

BACKGROUND INFORMATION

Among various types of handsfree apparatuses, the description of Japanese patent document JP-A-2002-193046 (U.S. Pat. No. 7,251,507) discloses a handsfree apparatus having Bluetooth (registered trade mark) communication function for use in a vehicle that controls a cellular phone to transmit telephone directory data in the cellular phone by establishing PBAP (Phone Book Access Profile) connection for regulating the telephone directory data transmission when the cellular phone carried by a user is equipped with Bluetooth communication function and is within a Bluetooth communication range due to the boarding of the user in a vehicle having the handsfree apparatus.

The handsfree call from the vehicular handsfree apparatus by using the cellular phone is controlled, for example, by utilizing a telephone number in an outbound call history data or in an inbound call history data transmitted from the cellular phone as a call number for placing an outbound call.

When the telephone directory data registered in the cellular phone is utilized by the vehicular handsfree apparatus, the telephone directory data must be transmitted from the cellular phone to the vehicular handsfree apparatus in advance. If a huge amount of the directory data is stored in the cellular phone (i.e., a large number of registered items is in storage), which is usually the case, time to transmit the directory data from the cellular phone to the apparatus becomes long and a huge storage area for storing the directory data is required. Further, when the user searches for a telephone number by operating the vehicular handsfree apparatus, the large number of telephone numbers in the telephone directory data makes it more complicated for the user to perform the telephone number search.

SUMMARY OF THE INVENTION

In view of the above and other problems, the present disclosure provides a vehicular handsfree apparatus that does not require a transmission of a huge amount of telephone directory data from a cellular phone with an improved operability in terms of searching the telephone directory data.

In an aspect of the present invention, the vehicular handsfree apparatus includes: a handsfree connection unit for establishing connection of a protocol that enables a handsfree call of a cellular phone; at least one of an outbound call history data acquisition unit for acquiring history data of outbound call telephone numbers from the cellular phone and an inbound call history data acquisition unit for acquiring history data of inbound call telephone numbers from the cellular phone; a telephone directory data acquisition unit for acquiring, from the cellular phone, telephone directory data showing relations between registration information that is registered to the cellular phone and telephone numbers in the cellular phone; a storage unit for storing the telephone directory data; and a control unit for performing an outbound call control that determines the outbound call telephone number and places a call by displaying on a display the telephone directory data stored in the storage unit and by receiving from an operation unit a selection operation to select a desired telephone number in a handsfree call protocol established condition enabled by the handsfree connection unit.

When the telephone number in the outbound call history data acquired by the outbound call history data acquisition unit or the telephone number in the inbound call history data acquired by the inbound call history data acquisition unit is registered in the telephone directory data in the cellular phone, the control unit controls the telephone directory data acquisition unit to acquire, from the cellular phone, a portion of the telephone directory data corresponding to the acquired telephone number together with the registration information associated with the acquired telephone number, and the control unit stores in the storage unit the registration information acquired from the cellular phone by the telephone directory data acquisition unit as the telephone directory data of the vehicular handsfree apparatus after associating the acquired registration information with one of the telephone number in the outbound call history data acquired by the outbound call history data acquisition unit and the telephone number in the inbound call history data acquired by the inbound call history data acquisition unit.

In this manner, not by acquiring all of the telephone directory data registered in the cellular phone, but by acquiring a part of the data that includes the registration information corresponding to the acquired telephone number for storing as the telephone directory data of the vehicular handsfree apparatus for placing an outbound call, transmission volume of the telephone directory data from the cellular phone to the vehicular handsfree apparatus is reduced, and the operability of the handsfree apparatus is improved in terms of searching for a telephone number in the telephone directory data. In other words, only a portion of the telephone numbers in the telephone directory data that reflects a recent outbound and inbound call history is transmitted to the vehicular handsfree apparatus.

BRIEF DESCRIPTION OF THE DRAWINGS

Other objects, features and advantages of the present invention will become more apparent from the following detailed description made with reference to the accompanying drawings, in which:

FIGS. 2A and 2B are diagrams exemplarily showing outbound call history data and inbound call history data of a cellular phone;

FIG. 3 is a diagram exemplarily showing telephone directory data of the cellular phone;

FIG. 5 is a diagram exemplarily showing an outbound/inbound call history data in the in-vehicle handsfree device;

FIG. 6 is another diagram exemplarily showing the outbound/inbound call history data in the in-vehicle handsfree device;

FIG. 7 is a diagram exemplarily showing telephone directory data of in-vehicle handsfree device (registered name order);

FIG. 8 is a diagram exemplarily showing telephone directory data of in-vehicle handsfree device (call number order); and FIGS. 9A and 9B are illustrations of a display of telephone numbers.

DETAILED DESCRIPTION

Figure 1:
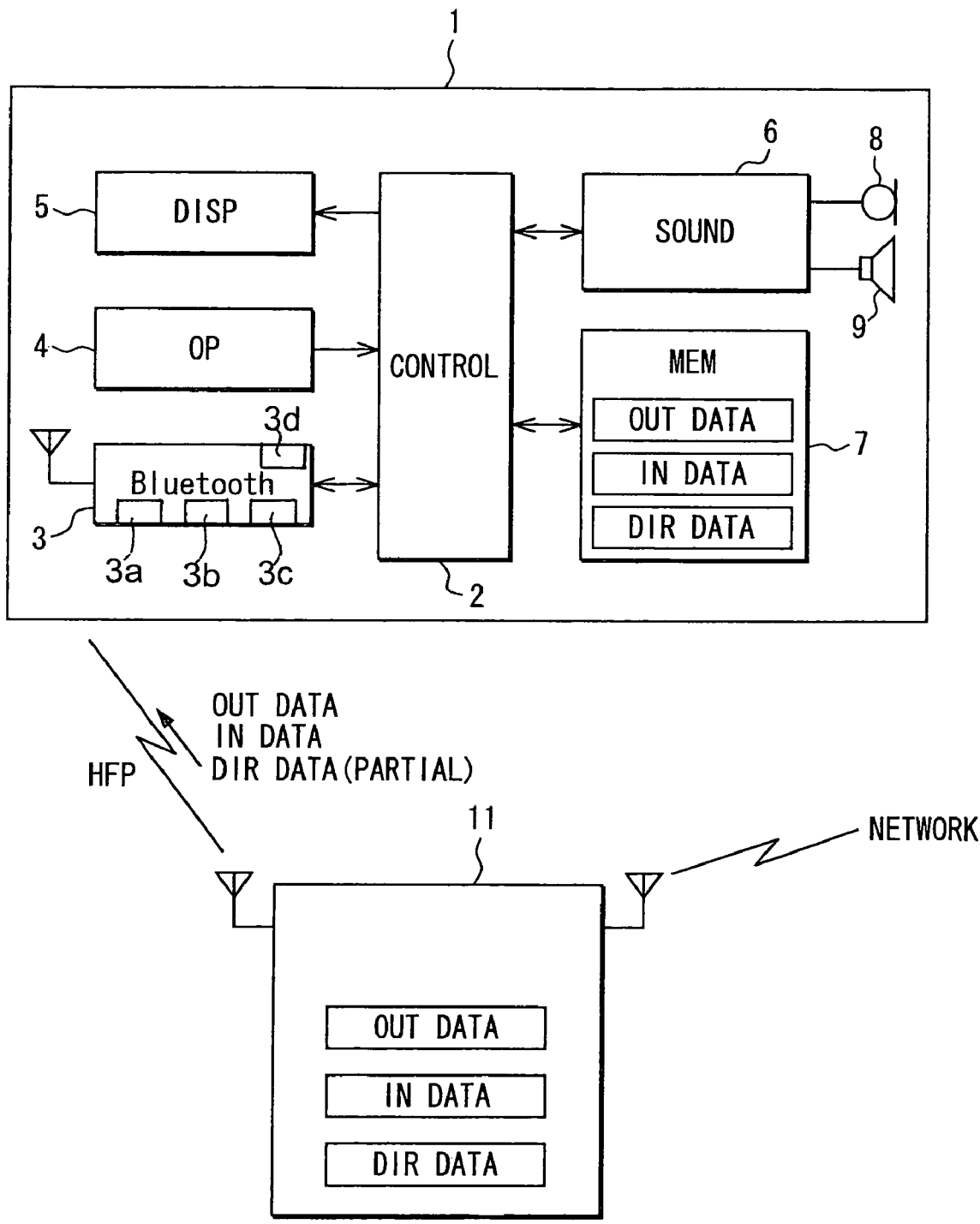
FIG. 1 is a function block diagram of an in-vehicle handsfree device in one embodiment of the present invention.

Hereafter, an embodiment of the present invention about an in-vehicle handsfree device with Bluetooth telecommunication function is described referring to the drawing. FIG. 1 shows a function block diagram of an in-vehicle handsfree device in an embodiment of the present invention. The in-vehicle handsfree device 1 has a control part 2 (a control unit of the present invention), and a Bluetooth communication part 3 (a handsfree connection unit 3a, an outbound call history data acquisition unit 3b, an inbound call history data acquisition unit 3c, and a telephone directory data acquisition unit 3d of the present invention), an operation unit 4 (an operation unit of the present invention), a display 5 (a display of the present invention), a sound unit 6, and a memory 7 (a storage unit of the telephone directory data of the present invention).

The control part 2 controls the communication operation and the data management operation of the in-vehicle handsfree device 1 and the like. The Bluetooth communication part 3 sets up a handsfree telephone call using a cellular phone 11 through the in-vehicle handsfree device 1 by connecting a HFP (Handsfree Profile) that regulates a handsfree telephone call of the cellular phones 11 if the cellular phone 11 having the Bluetooth telecommunication function exists in the Bluetooth communication range.

The operation unit 4 has several keys that the user can operate, and outputs to the control part 2 an operation signal that reflects the operation contents input by the user. The display 5 is composed of a liquid crystal display, for instance, and, when the display instruction signal is input from the control part 2, displays a screen on the basis of the input display instruction signal. The sound unit 6 performs sound processing for input sound from a microphone 8 and for outputting sound from a speaker 9. As for the microphone 8, it is disposed at a position in a proximity of a steering wheel for instance for collecting user's voice, and as for the speaker 9, it is disposed as a speaker for, for example, an audio system in the vehicle.

The memory 7 has an outbound call history data storage area to memorize the outbound call history data, an inbound call history data storage area and to memorize and the inbound call history data, and a telephone directory data storage area to memorize the telephone directory data. The control part 2 memorizes in the outbound call history data storage area of the memory 7 the outbound call history data that is forwarded from the cellular phone 11 to the Bluetooth communication part 3, and memorizes in the inbound call history data storage area of the memory 7 the inbound call history data that is forwarded from the cellular phone 11 to the Bluetooth communication part 3, and memorizes in the telephone directory data storage area of the memory 7 the telephone directory data that is forwarded from the cellular phone 11 to the Bluetooth communication part 3. The handsfree device 1 described above is configured, in this case, to start and end its operation in association with turning on and off of an ACC (i.e., accessory) switch.

As for the cellular phone 11, it is configured to be capable of memorizing a predetermined number of entries of the outbound call history data that shows the history of the outbound call number from the subject cellular phone 11 and a predetermined number of entries of the inbound call history data that shows the history of the inbound call number to the subject cellular phone 11. Further, the cellular phone 11 is configured to be capable of memorizing a predetermined number of entries of telephone directory data that is registered through operations by the user of the cellular phone 11.

The outbound call history data memorized in the cellular phone 11 is, as shown in FIG. 2A, the data consisting of a predetermined number in which the correspondence of the call date/time and the outbound call number is shown (in FIG. 2A, 20 entries for instance). When a new call is placed exceeding the predetermined number, the oldest call history at the time of calling is deleted and the call history concerning a new call is appended to the history data for updating the data call by call. The inbound call history data memorized in the cellular phone 11 is, as shown in FIG. 2B, the data consisting of a predetermined number in which the correspondence of the call date/time and the inbound call number is shown (in FIG. 2B, 20 entries for instance). In the same manner as the above case, when a new call is coming exceeding the predetermined number, the oldest call history is deleted and the inbound call history concerning new call is appended to the history data for updating the data call by call. The telephone directory data registered in the cellular phone 11 is, as shown in FIG. 3, the data consisting of a predetermined number in which the correspondence of the registered name and the telephone number is shown (in FIG. 3, 500 entries for instance). In this case, the control part 2 has a pre-selected setting, as telephone directory data generation conditions, that specifies an entry item sort condition in one of a registered name order and a number of inbound/outbound calls.

Figure 4:
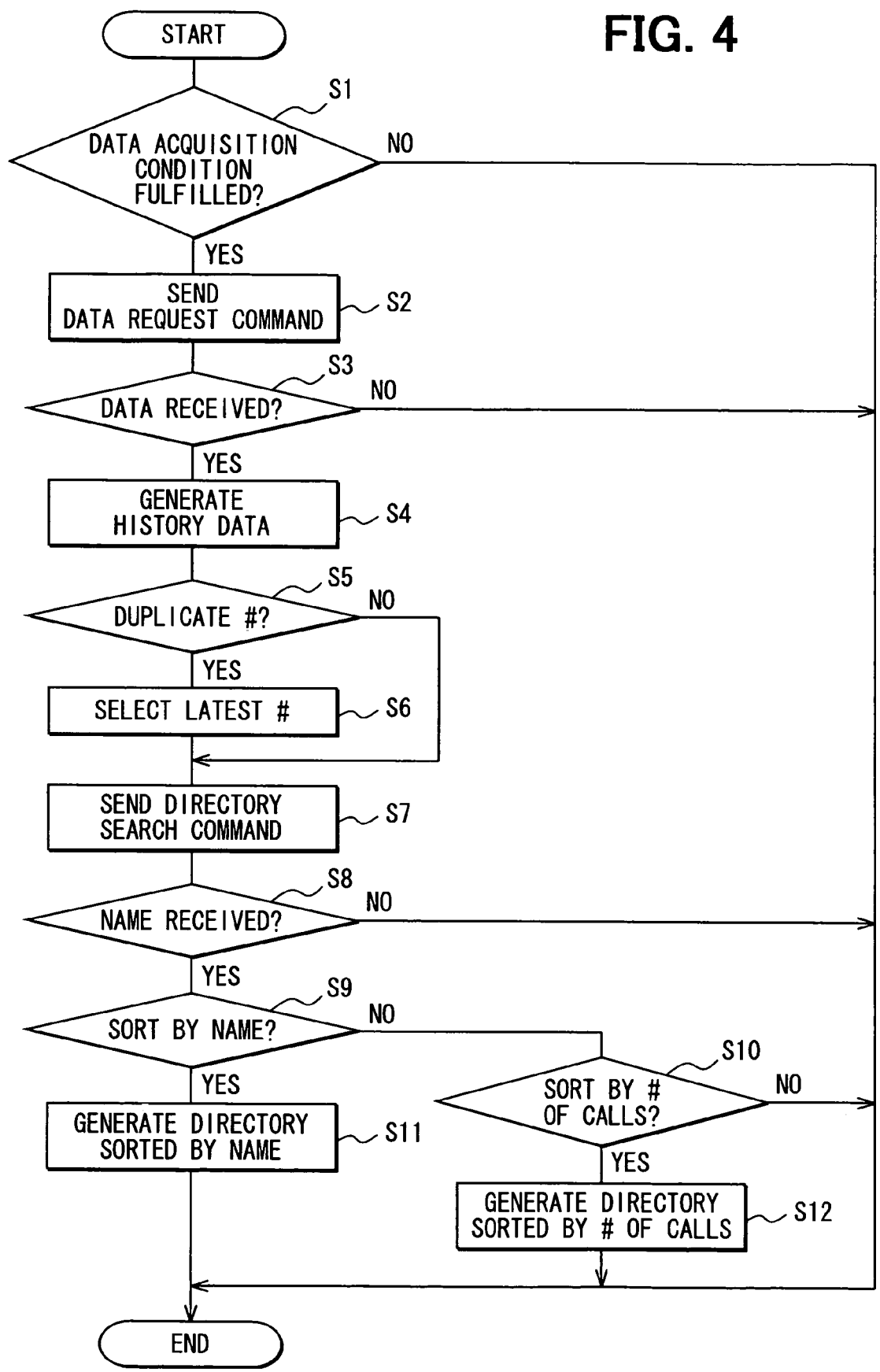
FIG. 4 is a flow chart of control processing in the handsfree device.

Next, how the above configuration works is described referring to FIGS. 4 to 9. FIG. 4 shows a flow chart of processing that the control part 2 of the in-vehicle handsfree device 1 performs. The control part 2 determines whether the condition of acquiring the outbound call history data and the inbound call history data from the cellular phone 11 is fulfilled (step S1). Then, the control part 2 controls the Bluetooth communication part 3 to transmit to the cellular phone 11 a history data request command (step S2) when the condition of acquiring the outbound call history data and the inbound call history data is determined to be fulfilled ("YES" in step S1), and waits for reception of the outbound call history data and the inbound call history data from the cellular phone 11 by using the Bluetooth communication part 3 (step S3). The cellular phone 11 transmits to the in-vehicle handsfree device 1 the outbound call history data and the inbound call history data memorized therein when it receives history data request command from the in-vehicle handsfree device 1.

Then, when the control part 2 determines that the control part 2 has received the outbound call history data and the inbound call history data from the cellular phone 11 by the Bluetooth communication part 3 ("YES" in step S3), the control part 2 controls the memory 7 to memorize the received outbound call history data in the outbound call history data storage area of the memory 7, and to memorize the inbound call history data in the inbound call history data storage area of the memory 7 for updating the data in the memory 7, as well as generating the history data that lists the outbound call history data and the inbound call history data in a sort order of call transmission/reception time shown in FIG. 5 (step S4).

The condition of acquiring the outbound call history data and the inbound call history data from the cellular phone 11 is that the cellular phone 11 exists at least in the Bluetooth communication range of the Bluetooth communication part 3, and, that disagreement of the data (inbound and outbound history) between the cellular phone 11 and the memory 7. That is, when the control part 2 determines that (a) the cellular phone 11 at least exists in the Bluetooth communication range of the Bluetooth communication part 3 and that the outbound call history data and the inbound call history data stored in the cellular phone 11 disagree with the outbound call history data and the inbound call history data memorized in the memory 7, for instance, the control part 2 determines that the condition for acquiring the outbound call history data and the inbound call history data from the cellular phone 11 is fulfilled. The control part 2 may determine the fulfillment of the data acquisition condition upon detecting that the cellular phone 11 exists in the Bluetooth communication range of the Bluetooth communication part 3, without examining the agreement of the data in the cellular phone 11 with the data in the memory 7.

When the number of the outbound/inbound data in the memory 7 exceeds the number of data in the cellular phone 11, the control part 2 controls, at the moment of the comparison of the number of data, the cellular phone 11 to transmit all of the outbound/inbound data stored therein to the outbound/inbound call history data storage area of the memory 7 for storage. When the number of the data in the memory 7 is smaller than the number of data in the cellular phone 11, the control part 2 controls, at the moment of data comparison, the cellular phone 11 to transmit a selected portion of the data (e.g., data having a newer reception/transmission time) in a prioritized manner to the outbound/inbound call data storage area in the memory 7 for storage.

Then, the control part 2 determines whether there are duplicate telephone numbers in the outbound call history data and the inbound call history data after sorting the data in a transmission and reception time (step S5), and, as shown in FIG. 6, selects only of the newest telephone number in terms of the transmission and reception time from the duplicate numbers and deletes the non-selected duplicate telephone number data (step S6) when the control part 2 determines that there are duplicate telephone numbers ("YES" in step S5). Then, the control part 2 controls the Bluetooth communication part 3 to transmit telephone directory search command to the cellular phone 11 (step S7), and waits for reception of the registered name that corresponds to the searched telephone number by the Bluetooth communication part 3 (step S8). When the cellular phone 11 receives the telephone directory search command from the in-vehicle handsfree device 1, the cellular phone 11 searches the telephone directory data, and transmits to the in-vehicle handsfree device 1 the registered name corresponding to the telephone number received from the in-vehicle handsfree device 1.

When the control part 2 determines that the corresponding registered name is received from the cellular phone 11 by the Bluetooth communication part 3 ("YES" in step S8), the control part 2 determines whether the telephone directory data generation condition at the time of reception of the registered name is based on the registered name order or the inbound/outbound call number order (steps S9 and S10). Then, the control part 2 sorts previously created inbound/outbound call history data that exists at the time of determination in the registered name order when the control part 2 determines that the telephone directory data generation condition is set to the registered name order ("YES" in step S9), and generates the telephone directory data in the alphabetical order of the registered name as shown in FIG. 7 for generating the telephone directory data to list a name "AOKI" at the top and for storing the name ordered telephone directory data in the telephone directory data storage area of the memory 7 (step S11).

Further, when the control part 2 determines that the telephone directory data generation condition is set to the call number order at the moment ("YES" in step S10), the control part 2 re-sorts the previously generated inbound/outbound telephone history data in the call number order as shown in FIG. 8 for generating the telephone directory data to list a name "TANAKA" at the top and for storing the telephone directory data storage area of the memory 7 (step S12).

Thereafter, the control part 2 displays on the display 5 the telephone directory data stored in the telephone directory data storage area of the memory 7 whenever the user is determined to perform a telephone directory data read operation by the operation unit 4. That is, the control part 2 displays the telephone directory data in the order of the registered name on the display 5 as shown in FIG. 9A if the telephone directory data stored at the moment is generated by the registered name sort order, or the control part 2 displays the telephone directory data in the order of the inbound/outbound call number on the display 5 as shown in FIG. 9B if the telephone directory data stored at the moment is generated by the call number sort order. In FIG. 9, the telephone number selected by the control part 2 is shown in a square of the broken line. The user can use the telephone number in the selected condition by performing a selection operation through the operation unit 4. Then, the user can place a call to the selected telephone number by performing a call-placement operation by using the operation unit 4.

As a result, the user can place a call by searching for a telephone number only in the outbound call history data and the inbound call history data transmitted from the cellular phone 11, instead of searching the number in all of the telephone directory data registered in the cellular phone 11, that is, by searching for a telephone number only in the telephone directory data that reflects recent outbound call history or recent inbound call history of the cellular phone 11.

The in-vehicle handsfree device 1 does not control the cellular phone 11 to forward all of the telephone directory data registered in the cellular phone 11, but only a part of the directory data in a selective manner that examines the outbound/inbound call history data forwarded from the cellular phone 11. That is, the telephone numbers in the directory on the cellular phone 11 found in the outbound/inbound call history data are forwarded to the device 1 together with their registered name for storage therein and for use in a call placement operation. Therefore, a huge amount of telephone directory data needs not be transmitted from the cellular phone 11 to the handsfree device 1, and a desired telephone number is searched from among the data that reflects recent outbound/inbound call history for placing a call. As a result, usability of the telephone directory on the in-vehicle handsfree device 1 is improved.

Moreover, duplication of the telephone numbers forwarded from the cellular phone 11 is eliminated for only retaining the telephone numbers with the latest call date in the outbound/inbound call history data. Therefore, the telephone directory data storage area is more efficiently used, and telephone number search operations are simplified. Further, the telephone numbers listed on the screen is sorted either by the registered name order or call number order, thereby enabling the user to search the telephone number by name, or by the number of outbound/inbound calls.

Although the present invention has been fully described in connection with the preferred embodiment thereof with reference to the accompanying drawings, it is to be noted that various changes and modifications will become apparent to those skilled in the art.

For example, the present invention may also be applied to an in-vehicle navigation device that has a handsfree function besides an in-vehicle handsfree device as described in the above embodiment.

Further, only one of the outbound call history data and the inbound call history data may be forwarded to the in-vehicle handsfree device for matching and generating the telephone directory data that associates the telephone number in one of the outbound/inbound call history data with registered name that is used in the cellular phone 11.

Furthermore, the data transmission may be performed not only by Bluetooth communication, but also by other communication methods, or by communication through wired connection.

Furthermore, the outbound/inbound call history acquisition conditions that trigger the data acquisition from the cellular phone to the handsfree device may be different from the one described above.

Such changes and modifications are to be understood as being within the scope of the present invention as defined by the appended claims.

What is claimed is:

1. A vehicular handsfree apparatus for use in a vehicle comprising,
    a handsfree connection unit establishing connection of a protocol that enables a handsfree call of a cellular phone;
    at least one of an outbound call history data acquisition unit acquiring only history data of outbound call telephone numbers stored in the cellular phone and an inbound call history data acquisition unit acquiring only history data of inbound call telephone numbers stored in the cellular phone;
    a telephone directory data acquisition unit acquiring telephone directory data showing a relation between each of the telephone numbers in the at least one of the outbound call history data acquisition unit and the inbound call history data acquisition unit and registration information related to the telephone number stored in the cellular phone;
    a storage unit storing the telephone directory data, the only stored telephone directory data being the telephone directory data showing the relation between each of the telephone numbers in the at least one of the outbound call history data acquisition unit and the inbound call history data acquisition unit and the registration information related to the telephone number stored in the cellular phone; and
    a control unit performing an outbound call control that determines a desired telephone number and places a call to the desired telephone number by displaying on a display the telephone directory data stored in the storage unit and by receiving from an operation unit a selection operation to select the desired telephone number in a handsfree call protocol established condition enabled by the handsfree connection unit, wherein,
    when a telephone number in the outbound call history data acquired by the outbound call history data acquisition unit or a telephone number in the inbound call history data acquired by the inbound call history data acquisition unit is registered in the telephone directory data in the cellular phone, the control unit controls the telephone directory data acquisition unit to acquire, from the cellular phone, a portion less than all of the telephone directory data corresponding to the acquired telephone number together with the registration information associated with the acquired telephone number, and
    the control unit stores in the storage unit the registration information associated with the acquired telephone number and acquired from the cellular phone by the telephone directory data acquisition unit as the telephone directory data of the vehicular handsfree apparatus after associating the acquired registration information with one of the telephone numbers in the outbound call history data acquired by the outbound call history data acquisition unit and the telephone numbers in the inbound call history data acquired by the inbound call history data acquisition unit.

2. The vehicular handsfree apparatus of claim 1, wherein the control unit stores in the storage unit only one data element having a newest outbound call data and time from duplicated data elements of the outbound call history data acquired from the cellular phone by the outbound call history data acquisition unit or only one element having a newest inbound call date and time from duplicated data elements of the inbound call history data acquired from the cellular phone by the inbound call history data acquisition unit when the duplicated data elements of the outbound call history data or the duplicated data elements of the inbound call history data are found.

3. The vehicular handsfree apparatus of claim 1, wherein the control unit controls the display to display the telephone directory data stored in the storage unit in an order of registration name.

4. The vehicular handsfree apparatus of claim 1, wherein the control unit controls the display to display the telephone directory data stored in the storage unit in an order of one of a number of outbound calls and a number of inbound calls.

* * * * *